United States Patent
Hwang

(10) Patent No.: US 7,231,002 B2
(45) Date of Patent: Jun. 12, 2007

(54) APPARATUS FOR RECOVERING CARRIER

(75) Inventor: Yong Suk Hwang, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 786 days.

(21) Appl. No.: 10/683,443

(22) Filed: Oct. 14, 2003

(65) Prior Publication Data

US 2004/0131132 A1 Jul. 8, 2004

(30) Foreign Application Priority Data

Oct. 31, 2002 (KR) .................. 10-2002-0067134

(51) Int. Cl.
*H03D 1/24* (2006.01)

(52) U.S. Cl. ............... 375/322; 375/327; 375/373; 455/204

(58) Field of Classification Search .......... 375/316, 375/322, 324; 455/204
See application file for complete search history.

(56) References Cited

U.S. PATENT DOCUMENTS

| | | | | |
|---|---|---|---|---|
| 6,222,891 B1 * | 4/2001 | Liu et al. | ..................... | 375/326 |
| 6,389,070 B1 * | 5/2002 | Cugnini et al. | ............. | 375/232 |
| 6,665,355 B1 * | 12/2003 | Chen et al. | ................. | 375/321 |
| 6,671,339 B1 * | 12/2003 | Ahn | ........................... | 375/346 |
| 6,980,609 B1 * | 12/2005 | Ahn | ........................... | 375/343 |
| 7,016,446 B1 * | 3/2006 | Spalink | ...................... | 375/368 |

* cited by examiner

*Primary Examiner*—Kevin Kim
(74) *Attorney, Agent, or Firm*—Birch, Stewart, Kolasch & Birch, LLP

(57) ABSTRACT

An apparatus and method of detecting whether the carrier frequency is locked for confirming recovering carrier is normally performed is disclosed. The apparatus includes a lock detector for judging whether the carrier frequency is locked by extracting DC value form real number component and imaginary component of an OQAM signal, and comparing the accumulated DC value to set value.

18 Claims, 2 Drawing Sheets

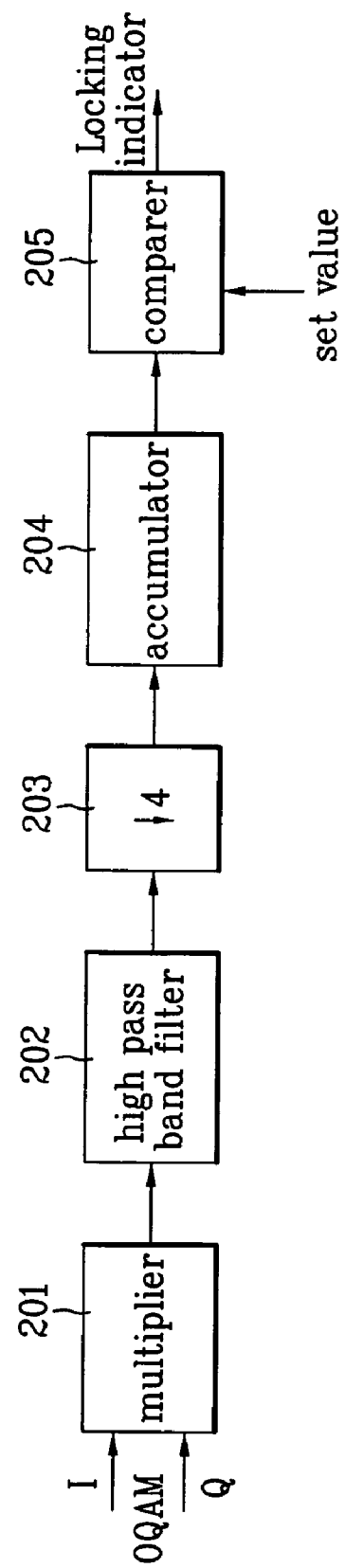

APPARATUS FOR RECOVERING CARRIER

CROSS-REFERENCE TO RELATED APPLICATIONS

This application claims the benefit of Korean Application No. P2002-67134, filed on Oct. 31, 2002, which is hereby incorporated by reference as if fully set forth herein.

BACKGROUND OF THE INVENTION

1. Field of the Invention

The present invention relates to a digital TV receiver, and more particularly, to an apparatus capable of judging whether the carrier frequency is locked in the digital TV receiver in VSB system and method for the same.

2. Description of the Related Art

Generally, VSB (vestigial sideband) system of Grand Alliance, employed as Korean and the USA digital TV (e.g., a HDTV) transmission standards, largely attenuates one sideband signal of two sideband signals around carrier, and modulates only the rest. In other words, the transmission system choosing only a spectrum of channels to modulate into a pass band signal is one of systems that effectively use band area.

During VSB modulation, if a DC spectrum of the base band is moved to the pass band, the DC spectrum of the base band is changed into a tone spectrum called a pilot signal. When VSB is modulated for a TV receptor to exactly copy the signals at a broadcasting station, the pilot signal is added and sent into air.

Hundreds KHz frequency offset and phase jitters are generated by a tuner or a RF generator when the TV receptor receives the VSB signals, and exact data recovery is carried out by reducing frequency offset and phase jitters to minimum. In this case, acquisition and tracking for reducing the frequency offset and phase jitters to the minimum are called carrier recovery, and the carrier recovery is carried out using the pilot signals.

However, because the pilot is reduced in a signal received in a channel environment having many reflected waves, such as an environment of a city center, use of the pilot at the carrier recoverer is limited. That is, there can be a case the data component is attenuated depending on a DTV reception channel environment, a case a frequency component in the pilot is attenuated, and, in the worst case, there can be a case the frequency component in the pilot is attenuated fully, such that no pilot component exhibits.

In a conventional VSB system digital TV, the carrier recovery is carried out using pilot components included in received signals, and whether the frequency is locked or not is determined using real number value. In this case, when carrier recovery is completely carried out, pilot exactly comes down to DC. In this case, the DC value has a value of either a positive number or a negative number. If the carrier recovery is not completely carried out because the pilot component is attenuated or not exhibited at all, the DC value keeps changing to the positive number or the negative number. In this case, the accumulated value is less than set value, and thus the carrier recovery is not exactly carried out. In the case the pilot component is reduced or fails to exhibit, accurate carrier recovery can fails. Moreover, the phase jitter, influenced from noise, becomes heavy following the reduction of the pilot.

SUMMARY OF THE INVENTION

Accordingly, the present invention is directed to an apparatus and a method for recovering carrier that substantially obviates one or more problems due to limitations and disadvantages of the related art.

An object of the present invention is to provide an apparatus and a method of recovering a digital TV carrier by detecting whether the carrier frequency is locked for confirming whether recovering carrier is normally performed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the apparatus for recovering carrier includes a first signal converter outputting a base band VSB signal by multiplying complex carrier according to pass band VSB signal and carrier phase error; a second signal converter for multiplying complex number value of a predetermined frequency to a signal outputted from the first signal converter for converting the base band VSB signal to an OQAM complex signal, a lock detector for detecting whether carrier frequency is locked using the OQAM complex signal, an error predictor for predicting the carrier phase error using real number component and imaginary number component of the OQAM complex signal, and an oscillator for creating complex carrier according to the carrier phase error. The lock detector extracts DC value from the real number component and imaginary component of the OQM signal, and detects whether the carrier frequency is locked using the extracted DC value.

In another aspect of the present invention, the lock detector includes a multiplier for multiplying the real number component and the imaginary component of the OQAM signal; a filter for passing high pass band of the signals outputted from the multiplier; a decimator for downsampling frequency component outputted from the filter and transforming to DC location; a accumulator for accumulating signals outputted from the decimator; and a comparer comparing the accumulated value outputted from the accumulator to set value for judging the carrier frequency is locked if the accumulated value is larger than the set value.

Yet another aspect of the present invention, the apparatus for recovering carrier includes a filter for passing only frequency component by timing edge of the signals outputted from the phase error, and a decimator for transforming the frequency component outputted from the filter to DC location.

A method for recovering carrier includes the steps of (a) converting a pass band VSB signal into a base band VSB signal by multiplying the pass band VSB signal and complex carrier according to carrier phase error; (b) converting the base band VSB signal into a OQAM complex signal by multiplying the base band VSB signal by the OQAM complex signal; (c) estimating the carrier phase error and detecting whether the carrier frequency is locked using the real number component and imaginary number component; (d) generating complex carrier according to the carrier frequency.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 2 is a detailed block diagram showing lock detector.

DETAILED DESCRIPTION OF THE INVENTION

Figure 1:
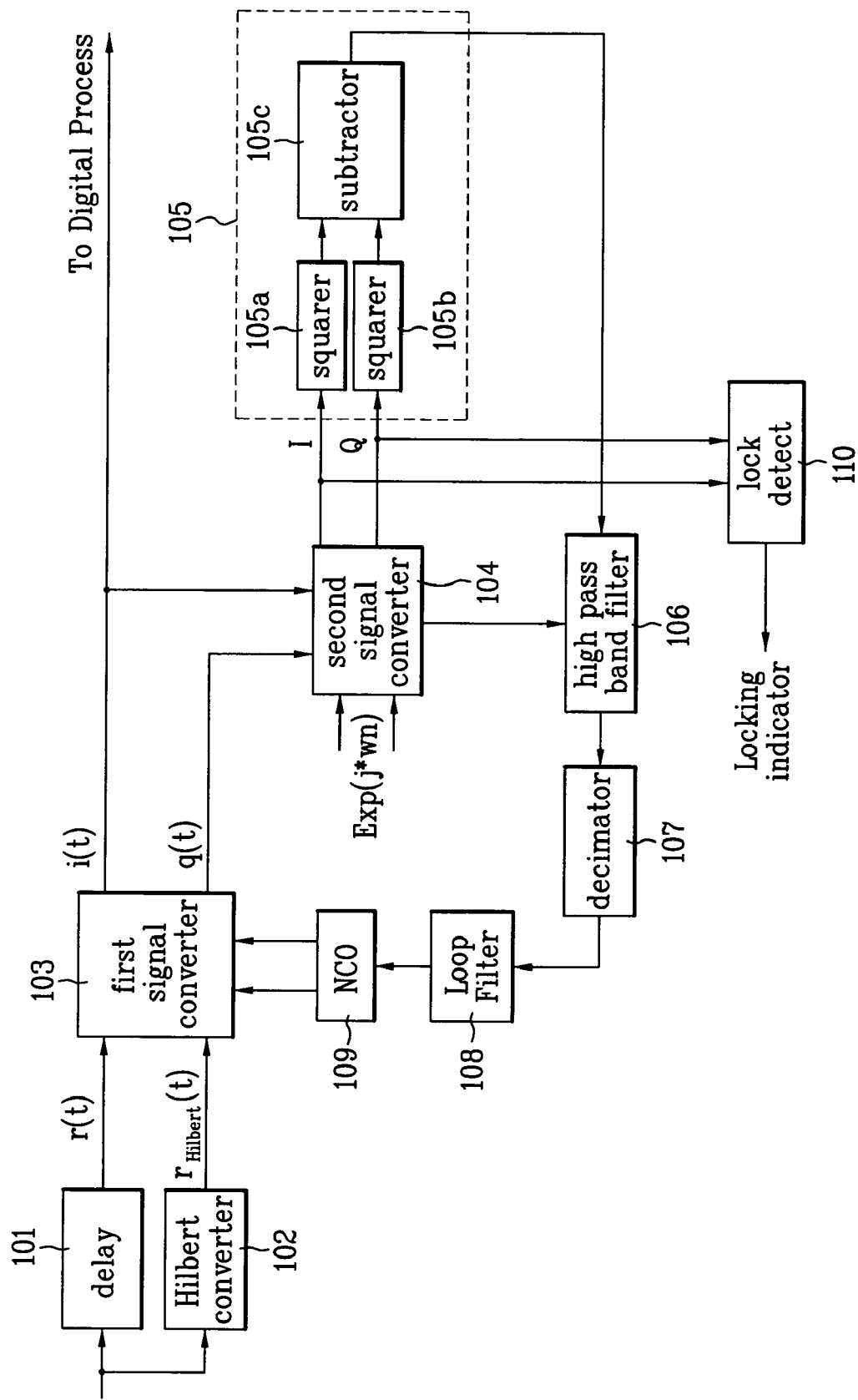
FIG. 1 is a block diagram showing an apparatus for recovering carrier of a digital TV in accordance with the present invention.

Reference will now be made in detail to the preferred embodiments of the present invention, examples of which are illustrated in the accompanying drawings. Wherever possible, the same reference numbers will be used throughout the drawings to refer to the same or like parts.

FIG. 1 is a block diagram of an apparatus for recovering a carrier according to the present invention. As shown in FIG. 1, digitized pass band VSB signals are inputted into a delayer 101 and into a Hilbert converter 102. The Hilbert converter 102 modulates the pass band VSB signals into an imaginary number $r_{hilbert}(t)$ signals by inversing the pass band VSB signals to 90°, and outputs to the first signal converter 103. The delayer 101 delays the pass band VSB signals as long as converting time at the converter 102, and outputs the delayed r(t) signals to the first signal converter 103. In this case, the $r_{hilbert}(t)$ is Q channel signal outputted from the Hilbert converter 102b, and r(t) outputted from the delayer 101 is I channel signal.

The first signal converter 103 multiplies a complex number value of the carrier by the r(t) and $r_{hilbert}(t)$ signals. The r(t) and $r_{hilbert}(t)$ signals are converted into i(t) and q(t) signals, respectively. The r(t) and $r_{hilbert}(t)$ signals of the pass band and the r(t) and $r_{hilbert}(t)$ signals of the base band are VSB form of signals.

A second signal converter 104 multiplies i(t) and q(t) signals of the base band by a complex number, i(t) and q(t) signals of the base band are changed into an OQAM signal. The OQAM signal is composed of real number and imaginary number components.

An error predictor 105 receives the OQAM signal outputted from the second converter 104, predicts a phase error of the carrier using the real number and imaginary components of the OQAM signal. The signal outputted from the error predictor 105 includes a component indicating a phase error size of the carrier and a component indicating a phase error direction of the carrier.

In a preferred embodiment, the error predictor 105 includes a multiplier 105a for multiplying the real number components of the OQAM signal, a multiplier 105b for multiplying the imaginary number components of the OQAM signal and a subtracter 105c for calculating difference between the outputs of the two multipliers 105a and the 105b as shown in FIG. 1.

In another preferred embodiment, the error predictor 105 includes a multiplier (not shown) for multiplying the real components and the imaginary components, and the error predictor predicts the size and the direction of the phase error using the multiplier.

In still another preferred embodiment, the error predictor 105 calculates the difference between the real number components and imaginary components, and predicts the size and direction of the phase error of the carrier from the difference.

Lock detector 110 detects whether the frequency of the OQAM signal outputted from the second signal converter 104 is locked. If there is linear noise such as a ghost in the OQAM signal when the pilot is used in the conventional method, the phase of the pilot (carrier) is as if it is rotated by 90 degree, that is, the real number components and the imaginary number components are changed with each other. To this end, it is not possible to get DC value of the pilot from the real number components and to know whether the frequency is locked. However, since the lock detector 110 of the present invention does not use the pilot for detecting whether the frequency is locked, the lock detector 110 can detect whether the frequency of the carrier is locked nevertheless the DC value of the pilot keeps changing into a positive number or a negative number.

As illustrated in FIG. 2, the lock detector 110 includes a multiplier 201 the lock detector 110 includes a multiplier 201 for multiplying the real number components and the imaginary components of the OQAM, a high pass band filter 202 for passing only the high pass of the signal outputted from the multiplier 201, a decimator 203 for downsampling the frequency component of the high pass filtered signal and transferring to the DC location, a accumulator 204 for accumulating the signal outputted from the decimator 203, a comparator 205 for comparing the accumulated value of the signal from the accumulator 204 with the set value, and if the accumulated value is larger than the set value, outputting a locking indicator by assuming that the frequency of the carrier is locked.

A method for recovering the carrier by an apparatus for recovering the carrier of the present invention structured as above will be described as follows.

First, the real number components of the digitized pass band VSB signal are inputted to the delayer 101 and to the Hilbert converter 102. The Hilbert converter 102 converts the real number components of the pass band into the imaginary number components by reversing the real number components 90 degree, and outputs to the first signal converter 103. The delayer 101 delays the pass band VSB signal as long as the processing time at the Hilbert converter 102, and the delayed signal r(t) is outputted to the first signal converter 103.

The first signal converter 103 multiplies a complex number carrier, which is comprised of a sine wave and a cosine wave, with the pass band r(t) and $r_{hilbert}(t)$ signals. At the same time, the pass band r(t) and $r_{hilbert}(t)$ signals are converted into i(t) and q(t) VSB signals of the base band, respectively.

After that, the second converter 104 multiplies exp(jwn) complex number value of a predetermined frequency to i(t) and q(t) VSB signals of the base band. In this case, $w=\pi/4$. And then, the center of VSB signal of the base band becomes OQAM signal moving to DC.

The OQAM complex number signals outputted from the second signal converter 104 are inputted to the error detector 105 for detecting the phase error of the carrier and to the lock detector 110 for detecting the frequency locking of the carrier.

The error detector 105 detects the phase error by squaring the real number components I of the OQAM signal at the squarer 105a, squaring the imaginary number components Q of the OQAM signal at the squarer 105b, and calculating the difference between the two squared values.

The high pass band filter 106 passes only the high pass components generated from a timing edge of the signal outputted from the error detector 105, and outputs to a decimator 107. The decimator 107 downsamples the frequency components outputted from the high pass band filter 106, and transfers to the DC location. In other words, the signals outputted from the decimator 107 are the phase error of the carrier as DC value.

A loop filter 108 filters and adds the output of the decimator 107, and outputs to a NCO 109. The NCO 109 creates complex number carrier in proportion to the output of the loop filter 108, and outputs the created complex number carrier to the first signal converter 103. In other words, the sine wave and the cosine wave corresponding to the frequency offset are outputted to the first signal converter 103 through the loop filter 108 and the NCO 109.

If the process is repeated, the carrier frequency signal similar to the component of the carrier frequency signal inputted from outside are generated from the NCO 109 and outputted to the first signal converter 103, and the first signal converter 103 can transfer the pass band VSB signal to a desired base band.

The multiplier 201 of the lock detector 110 multiplies the real number by imaginary number of the OQAM, and outputs the multiplied value to the high pass band filter 202. The high pass band filter 202 performs high pass band filtering to the multiplexed value and outputs the value to the decimator 203.

The decimator 203 downsamples the frequency of the high pass band filtered signal, transfers the signal to the DC location, and outputs to the accumulator 204. In this case, the DC value outputted from the decimator 203 has either a positive number value or a negative number value. The accumulator 204 accumulates output value of the decimator 203, and outputs the accumulated value to the comparer 205. The accumulator 204 applies different weight according to the positive DC value or negative DC value, and accumulates the DC value outputted from the decimator 203.

The comparer 205 compares the accumulated value with the set value. If the accumulated value is over the set value, the comparer 205 judges the frequency is locked and outputs the locking indicator.

When the error predictor 105 predicts the carrier phase error fro the $I^2-Q^2$ value of the OQAM signal and recovers the carrier using the predicted carrier phase error, the $I^2-Q^2$ value when the carrier frequency offset is locked is '0', and I*Q of the OQAM signal has the DC value.

The error predictor 105 can predict the carrier phase error by multiplying the real number component value of the OQAM signal by the imaginary number component value of the OQAM signal, or by calculating each absolute value of the real number component and the imaginary number of the OQAM signal, and calculating the difference between the two absolute signals.

If the phase error is extracted and the carrier is recovered by multiplying (I*Q) the real number component of the OQAM signal by the imaginary component of the OQAM signal, the $I^2-Q^2$ value has the DC value. Therefore, the lock detector 110 detects whether or not there is lock by counting the DC value through the accumulator 204. In this case, the lock detector 110 needs two of the squarer and subtractor.

To this end, when the apparatus for recovering the carrier estimates the carrier frequency error and the phase error to compensate, the output value of the decimator 107 is ideally close to '0', and the output value of the decimator 203 has the DC value.

Accordingly, the lock detector in accordance with the present invention multiples the real number component and the imaginary component of the OQAM signal together, or squares each one of them, extracts and accumulates the DC value from the difference of the two squared values, and distinguish whether the frequency is locked or not. Therefore, the lock detector can exactly recover the carrier and detect whether or not the frequency is locked even when the pilot component is reduced or not detected at all. Particularly, the lock detector has an effect of easily confirming whether the apparatus for recovering the carrier is working properly by detecting whether the carrier frequency is locked.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for recovering carrier, comprising:
   a first signal converter outputting a base band VSB signal by multiplying a pass band VSB signal and a complex number carrier according to a phase error;
   a second signal converter converting the base band VSB signal to an OQAM complex signal by multiplying a complex number value of a predetermined frequency to the signal outputted from the first signal converter;
   a lock detector detecting whether the carrier frequency is locked using the OQAM complex signal;
   an error predictor predicting the carrier phase error using the real number component and the imaginary number component of the OQAM complex signal; and
   an oscillator generating complex carrier according to the carrier phase error.

2. The apparatus of claim 1, wherein the error predictor multiplies the real number component and the imaginary component.

3. The apparatus of claim 1, wherein the error predictor squares the real number component and the imaginary component, and calculates difference between the square value of the real number component and the square value of the imaginary number component.

4. The apparatus of claim 1, wherein the error predictor calculates an absolute value of the real number component and the imaginary component, and calculates difference between the absolute value of the real number component and absolute value of the imaginary component.

5. The apparatus of claim 1, wherein the lock detector accumulates the extracted DC values, and distinguishes whether the carrier frequency is locked by comparing the accumulated DC value and set value.

6. The apparatus of claim 5, wherein the lock detector accumulates the extracted DC value, compares the accumulated DC value with the set value, and thereby distinguishes whether or not the carrier frequency is locked.

7. The apparatus of claim 5, wherein the lock detector multiplies the real number component and the imaginary number component together, and extracts the DC value from the result of multiplying.

8. The apparatus of claim 5, wherein the lock detector calculates squared value of the real number component and the imaginary number component of the OQAM signal, and extracts the DC value from the difference between the two squared values.

9. The apparatus of claim 1, wherein the lock detector comprises:
- a multiplier for multiplying the real number component and the imaginary component of the OQAM signal;
- a filter for passing the high pass band of the signal outputted form the multiplier;
- a decimator for sampling the frequency of the signal outputted from the filter down to transfer to the DC location;
- an accumulator for accumulating the signals outputted from the decimator; and
- a comparer for comparing the accumulated value outputted from the accumulator with the set value, and judging the carrier frequency is locked if the accumulated value is larger than the set value.

10. The apparatus of claim 1, further comprising:
- a filter for passing only the frequency by timing edge of the signal outputted from the phase error; and
- a decimator for transferring the frequency component outputted from the filter to the DC location.

11. A method for recovering carrier, comprising the steps of:
- (a) converting a pass band VSB signal into a VSB signal by multiplying the pass band signal and complex carrier according to phase error of the carrier together;
- (b) converting base band VSB signal into OQAM complex signal by multiplying base band VSB signal by complex number value of a predetermined frequency;
- (c) estimating carrier phase error and detecting whether carrier frequency is locked using real number component and imaginary component of the OQAM signal; and
- (d) creating complex carrier according to the phase error of the carrier.

12. The method of claim 11, comprising the steps of:
multiplying the real number component and the imaginary number component of the OQAM signal for estimating the carrier phase error; and
calculating difference between the squared ream number component and the squared imaginary number component of the OQAM signal for estimating whether the carrier frequency is locked.

13. The method of claim 12, wherein whether the carrier frequency is locked is judged by extracting DC value from the two squared values and comparing accumulated value to set value.

14. The method of claim 11, wherein each of the real number component and the imaginary number component are squared, difference between the two squared values is calculated, and the real number component and the imaginary number component of the OQAM signal are multiplied together for estimating whether the carrier frequency is locked.

15. The method of claim 14, wherein whether the carrier frequency is locked is judged by extracting DC value from the result of multiplying the real number component and the imaginary number component of the OQAM signal, and comparing the extracted DC value to the set value.

16. The method of claim 11, wherein each absolute value of the real number component and imaginary number component of the OQAM is calculated and difference between the absolute value of the real number component and the absolute value of the imaginary number component is calculated for estimating the carrier phase error.

17. The method of claim 11, further comprising the steps of:
filtering for passing only frequency component by timing edge of the signal including estimated carrier phase error; and
sampling the frequency component.

18. The method of claim 11, further comprises a step of transforming frequency component by timing edge of the signal including estimated carrier phase error to DC location.

* * * * *